UNITED STATES PATENT OFFICE.

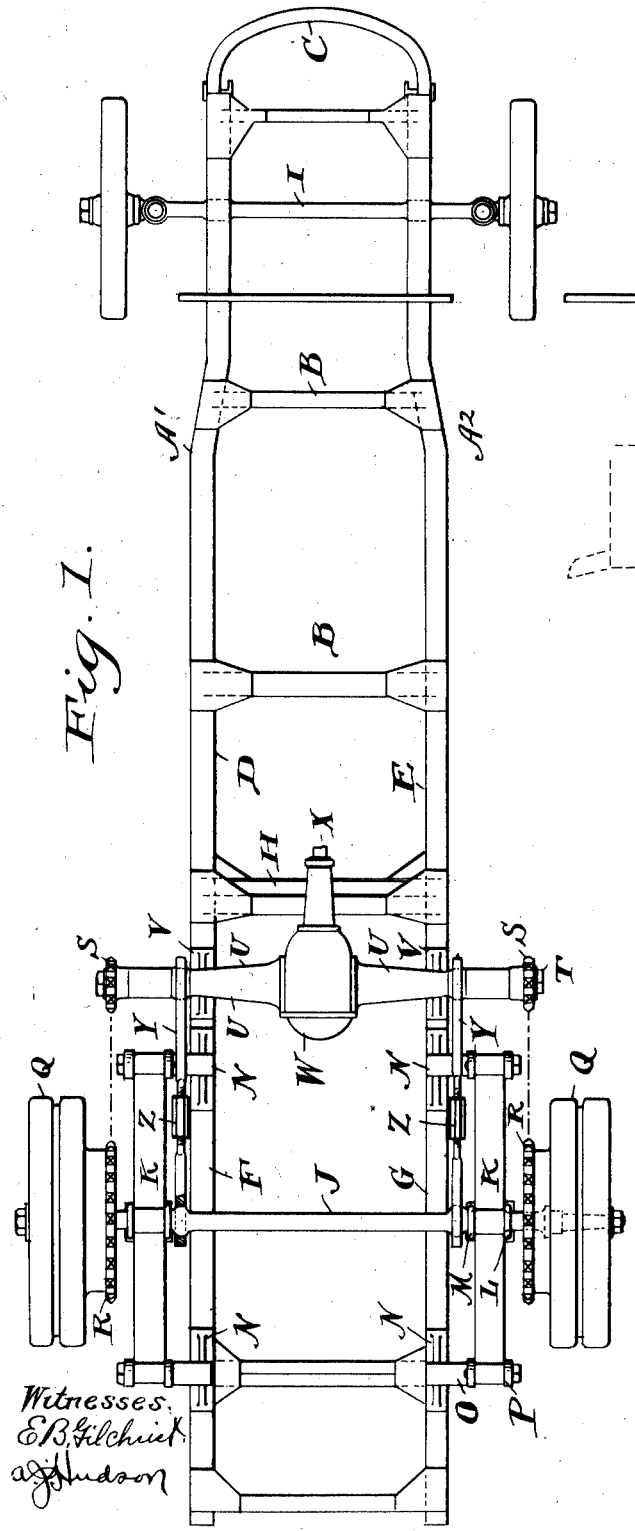
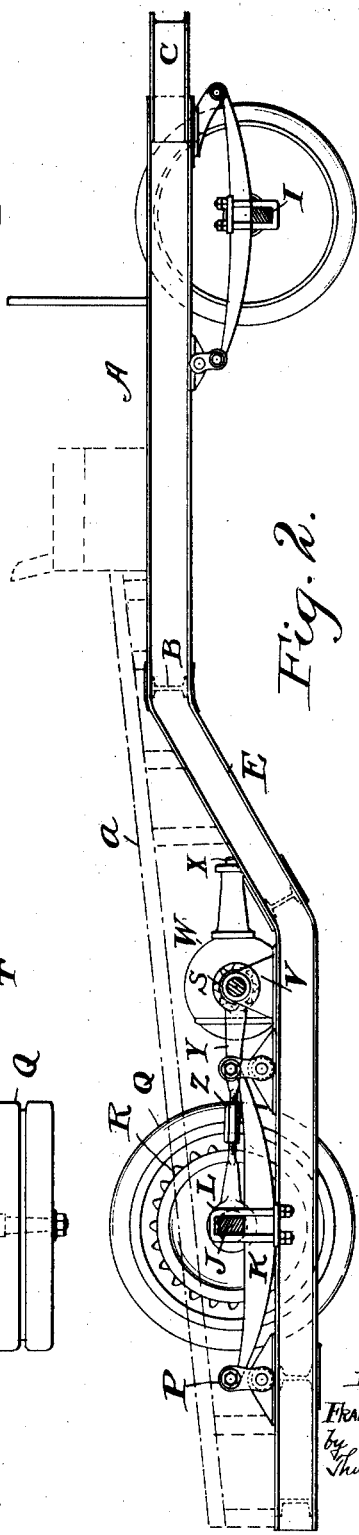

FRANK H. FARMER, OF CLEVELAND, OHIO, ASSIGNOR, BY MESNE ASSIGNMENTS, TO THE WHITE MOTOR COMPANY, OF CLEVELAND, OHIO, A CORPORATION OF OHIO.

MOTOR-TRUCK CONSTRUCTION.

1,341,306.     Specification of Letters Patent.     Patented May 25, 1920.

Application filed April 18, 1914. Serial No. 832,723.

*To all whom it may concern:*

Be it known that I, FRANK H. FARMER, a citizen of the United States, residing at Cleveland, in the county of Cuyahoga and State of Ohio, have invented a certain new and useful Improvement in Motor-Truck Construction, of which the following is a full, clear, and exact description.

This invention relates to motor truck construction, and more particularly to a chassis construction and mounting therefor with respect to the rear axle.

Generally speaking, the invention comprises the elements and combinations thereof set forth in the accompanying claims.

Reference should be had to the accompanying drawings forming a part of this specification, in which Figure 1 is a top plan view of the chassis frame and the mounting thereof with respect to the axles. Fig. 2 is a side elevation of the showing in Fig. 1 with the addition that the position of the floor of the truck is indicated in dotted lines.

In certain classes of vehicles, which are designed to carry heavy loads, it is desirable when propelling these vehicles by motive power that the center of gravity of the load be as low as is consistent and permissible, thereby reducing the likelihood of upsetting, and furthermore, when the center of gravity of the load is low, it permits the vehicle to be run with greater speed than would otherwise be the case. Further in loading and unloading heavy objects, it is manifestly desirable to move the objects through as short a distance vertically as may be.

The construction herein described accomplishes the desired features above mentioned.

As shown in the drawings, the chassis comprises what may be termed a forward portion and a rearward portion. The forward portion is indicated at A and includes the side pieces $A^1$, $A^2$, which are suitably braced by cross braces indicated at B. As is usual in this construction the forward ends of the side of the chassis will be connected in any suitable way, as indicated at C. The side pieces $A^1$ and $A^2$ are adjacent their rear end bent in a downwardly slanting direction, as indicated at D and E, and at their lower ends are secured to side pieces F and G, of which may be termed a lower chassis. The sides F and G will be spaced and braced by suitable transversely extending members, as indicated at H. In other words, if we consider the chassis as a whole it may be said that the front and rear portions lie in different horizontal planes with an intermediate connection. For convenience in making the side piece of the chassis and the slanting connection side pieces are formed as continuations by suitably bending channel irons.

The forward portion of the chassis is mounted upon an axle I in the usual manner, and the steering of the front wheels is also accomplished in the usual manner, so that no further description of these matters need be given.

The rear portion of the chassis has an underslung mounting, that is to say, the chassis is below the axle. The axle is represented at J, and at appropriate portions thereon is secured to the springs K by means of U-bolts, as indicated at L. These U-bolts straddle the axle and at their lower ends extend through a plate M which plate engages the bow side of a semi-elliptic spring. The upper side of the spring engages with the under side of the axle. The plate is held to the U-bolts by means of nuts engaging the threaded ends thereof, or in any other desired manner. The springs lie without the chassis, thereby permitting the lower portion of the chassis to be brought as close to the ground as practical.

Upon the side members M and G of the lower part of the chassis there are brackets N, which comprise a base that is secured to the side member of the chassis, and an outwardly extending arm O, which is of sufficient length to extend beneath the end of the spring adjacent thereto. The arm is secured to the adjacent end of the spring by the usual shackle construction which is represented at P.

The rear wheels Q are free to turn on the axle J and any usual or desired mounting for the wheels may be utilized.

Upon the inside of each wheel there is mounted a sprocket wheel R which is in alinement with a sprocket wheel S carried upon a transversely extended shaft T, and it will be understood that the sprocket wheels R and S may be connected by suitable sprocket chains.

The shaft T is the usual two part power shaft and is supported within housings U that are suitably secured upon brackets V carried by the side portions F and G of the chassis. Between the housings is the usual casing W within which is the differential mechanism connecting the sections of the power shaft T. The power shaft X extends rearwardly from the engine which is mounted upon the forward part of the chassis, as is usual in motor vehicle construction.

There are torsion rods Y which extend between the rear axle and the casings U, these being made adjustable as to length by means of the turnbuckle C, which construction is well known. This rod serves not only to definitely space the axle J from the shaft T, but also provides means for securing proper tension in the sprocket chain which connects the sprockets R and S.

The ends of the torsion rods are mounted in any suitable manner which permits relative movement between the rods and the parts upon which they are mounted.

A suitable floor $a$ is supported by the chassis. This floor is usually slanting to facilitate in the removing of objects that may be carried by the truck.

It will be apparent that changes in details may be effected in the construction just described without departing from the spirit of the invention.

Having thus described my invention, I claim:

1. In a motor vehicle construction, a chassis frame having its rear portion in a lower plane than its front portion; a rear axle and a power shaft both extending across the chassis frame above the lower portion thereof; springs secured to the axle and connected to the chassis frame; rear wheels on the rear axle; and driving means between the power shaft and said wheels.

2. In a motor vehicle construction, a chassis frame having its rear portion in a lower plane than its front portion, a rear axle having wheels thereon, and a power shaft extending transversely of the chassis frame above the lower portion thereof, driving means between the power shaft and the said wheels, springs secured to said axle, said springs lying outside of the said frame, hangers secured to the said frame to which the opposite ends of the springs are secured, and rods connecting the axle with the frame.

3. In a motor vehicle construction, a chassis frame having side members which are bent downwardly between their ends and then extend rearwardly so that the rear portion of the frame lies in a lower plane than the front portion; a rear axle and a power shaft both extending over the lower portion of the chassis frame; springs connecting the rear axle to the frame; supports on the chassis frame for the power shaft, the latter being in advance of, and at substantially the same height above the side members of the frame as the rear axle; a housing surrounding the power shaft; and torque rods extending between the rear axle and housing.

In testimony whereof, I hereunto affix my signature in the presence of two witnesses.

FRANK H. FARMER.

Witnesses:
A. J. HUDSON,
L. I. PORTER.